US008167318B2

(12) United States Patent
Ryan et al.

(10) Patent No.: US 8,167,318 B2
(45) Date of Patent: May 1, 2012

(54) HYDRAULIC ANTI-ROLL SYSTEM

(75) Inventors: Jeffrey S. Ryan, Willow Spring, NC (US); Todd J. Holbert, Kernersville, NC (US); David J. Holden, Davidson, NC (US); Jeff L. Peterson, Charlotte, NC (US); Seth D. Chavka, Cornelius, NC (US)

(73) Assignee: MSI Defense Solutions, LLC, Mooresville, NC (US)

( * ) Notice: Subject to any disclaimer, the term of this patent is extended or adjusted under 35 U.S.C. 154(b) by 0 days.

(21) Appl. No.: 12/862,866

(22) Filed: Aug. 25, 2010

(65) Prior Publication Data

US 2011/0068552 A1   Mar. 24, 2011

Related U.S. Application Data

(60) Provisional application No. 61/277,028, filed on Sep. 21, 2009.

(51) Int. Cl.
*B60G 21/06* (2006.01)
*B60G 17/04* (2006.01)

(52) U.S. Cl. .............. 280/5.506; 280/5.507; 280/124.16

(58) Field of Classification Search ................... 280/5.5, 280/5.506, 5.507, 5.508, 5.513, 124.157, 280/124.16, 124.161, 124.162, 124.106
See application file for complete search history.

(56) References Cited

U.S. PATENT DOCUMENTS

| 3,625,539 | A | 12/1971 | Crouch et al. |
|---|---|---|---|
| 3,752,497 | A | 8/1973 | Enke et al. |
| 4,345,661 | A | 8/1982 | Nishikawa |
| 5,087,073 | A | 2/1992 | Lund |
| 5,217,245 | A | 6/1993 | Guy |
| 5,219,181 | A | 6/1993 | Lund |
| 5,486,018 | A * | 1/1996 | Sakai ................. 280/124.16 |
| 5,556,115 | A * | 9/1996 | Heyring .............. 280/6.158 |
| 5,601,306 | A * | 2/1997 | Heyring .............. 280/5.508 |
| 5,749,596 | A | 5/1998 | Jensen et al. |
| 6,390,484 | B1 | 5/2002 | Green et al. |
| 6,517,094 | B1 | 2/2003 | Kincaid et al. |
| 6,519,517 | B1 * | 2/2003 | Heyring et al. ............ 701/37 |
| 6,604,034 | B1 * | 8/2003 | Speck et al. ............... 701/37 |
| 7,234,707 | B2 | 6/2007 | Green et al. |
| 2003/0075882 | A1 * | 4/2003 | Delorenzis et al. ...... 280/5.508 |
| 2003/0102646 | A1 * | 6/2003 | Gloceri et al. ......... 280/124.161 |
| 2004/0061292 | A1 * | 4/2004 | Hall ...................... 280/5.507 |

(Continued)

FOREIGN PATENT DOCUMENTS

WO   WO 98/47730 A1   10/1998

(Continued)

*Primary Examiner* — Joseph Rocca
(74) *Attorney, Agent, or Firm* — Hammer & Associates, P.C.

(57) ABSTRACT

A hydraulic anti-roll system for a vehicle includes a first hydraulic actuator, a second hydraulic actuator, an anti-roll control module, and an anti-roll bypass valve. The first hydraulic actuator is adapted to be connected between the suspension and frame of the vehicle on one side and the second hydraulic actuator is adapted to be connected between the suspension and frame of the vehicle on its other side. The anti-roll control module is connected between the fluid lines of the first and second hydraulic actuators. The anti-roll control module stiffens the compression of the first hydraulic actuator relative to the expansion of the second hydraulic actuator, and stiffens the compression of the second hydraulic actuator relative to the expansion of the first hydraulic actuator. The anti-roll bypass valve is adapted to activate and deactivate the stiffening of the anti-roll control module.

15 Claims, 11 Drawing Sheets

U.S. PATENT DOCUMENTS

2005/0225050 A1* 10/2005 Mizuno .................. 280/124.158
2008/0129000 A1* 6/2008 Munday et al. ............ 280/5.502
2008/0272561 A1 11/2008 Monk et al.
2009/0115147 A1 5/2009 Zuurbier et al.
2010/0063679 A1* 3/2010 Maurischat et al. ............ 701/39

FOREIGN PATENT DOCUMENTS

WO    WO 2006092013 A1 * 9/2006

* cited by examiner

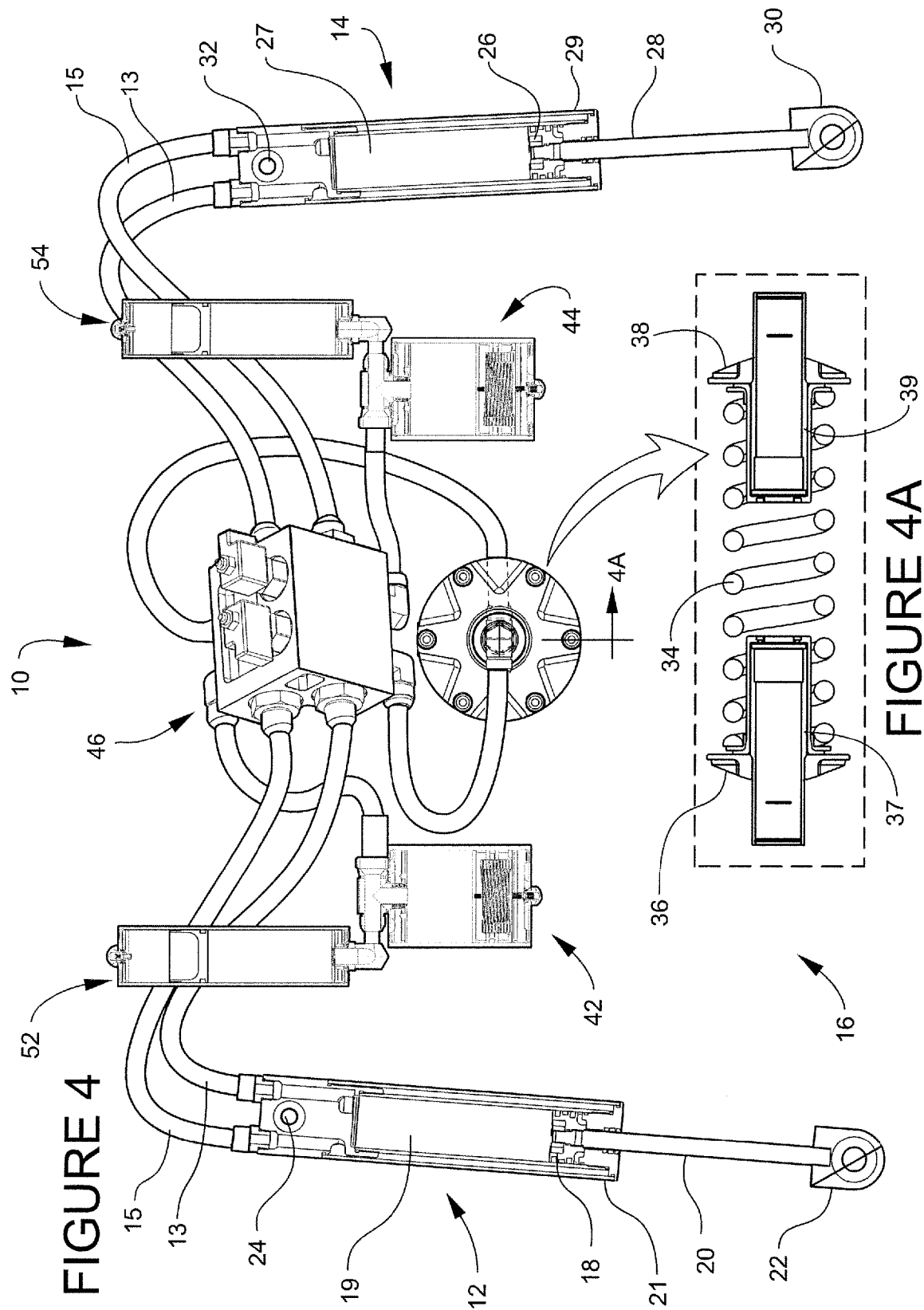

HYDRAULIC ANTI-ROLL SYSTEM

CROSS-REFERENCE TO RELATED APPLICATIONS

This application claims priority to U.S. Provisional Patent Application Ser. No. 61/277,028, filed Sep. 21, 2009, which is incorporated herein by reference.

FIELD OF INVENTION

The instant invention relates to anti-roll systems for vehicles, and more particularly, to hydraulic anti-roll systems for vehicles.

BACKGROUND OF THE INVENTION

A vehicle anti-roll system is a system designed to resist vehicle body roll motions or leans, for example, in a turn when a vehicle is steering or cornering. In a turn, lateral acceleration of the vehicle produces a lateral force at the centre of gravity. This lateral force creates a twisting force about the roll axis that leads to body roll or lean in the vehicle. One effect of the vehicle rolling or leaning is reduction in tire grip due to the positive camber of the wheels on the outside of the turn and negative on the inside. Thus, there is clearly a need for an anti-roll system to prevent or reduce the rolling or leaning of the vehicle.

Anti-roll systems provide two main functions. The first function is the reduction of body roll or lean. The reduction of body roll or lean is dependent on the total roll stiffness of the vehicle. Increasing the total roll stiffness of a vehicle does not change the weight transfer from the inside wheels to the outside wheels, it only reduces body lean. Another function of anti-roll systems is to tune the handling balance of a vehicle. The degree of understeer or oversteer can be tuned by changing the proportion of the total roll stiffness that comes from the front and rear axles. Increasing the proportion of roll stiffness at the front will increase the proportion of the total load transfer that the front axle reacts and decrease the proportion that the rear axle reacts. This will cause the outer front wheel to run at a comparatively higher slip angle, and the outer rear wheel to run at a comparatively lower slip angle, which is an understeer effect. Increasing the proportion of roll stiffness at the rear axle will have the opposite effect and decrease understeer.

The most common anti-roll system is a mechanical anti-roll bar, also known as a sway bar, a stabilizer bar, an anti-sway bar, a roll bar, or abbreviated as ARB. An anti-roll bar is a form of a torsion spring that stiffens or resists the roll of the vehicle. Anti-roll bars are usually constructed out of a U-shaped piece of metal, typically steel, that connects to the left and right sides of the suspension/wheels and at two mounting points in between. If the left and right wheels move together, the bar rotates about its mounting points and does not bend or twist and imparts no or negligible force to the respective wheels and suspension components. If the wheels move relative to each other, the bar is subjected to torsion and forced to twist. The bar resists the torsion through its strength or stiffness. The stiffer or stronger the bar, the more force required to move the left and right wheels relative to each other, which as a result, increases the amount of force required to make the vehicle roll.

One known problem with mechanical anti-roll bars is that the bar will transmit the force of one-wheel bumps to the opposite wheel because an anti-roll bar connects wheels on the opposite sides of the vehicle together. On rough or broken pavement, anti-roll bars can produce jarring, side-to-side body motions (a "waddling" sensation), which increase in severity with the diameter and stiffness of the anti-roll bars. Excessive roll stiffness, typically achieved by configuring an anti-roll bar too aggressively, will cause the inside wheels to lift off the ground during very hard cornering. This, of course, is only possible if the regular spring rate actually allows the outside wheels to handle the much increased load.

Another problem with mechanical anti-roll bars is that they are difficult or impossible to install on vehicles with abnormally shaped or sized hulls or chassis. As discussed above, a mechanical anti-roll bar is usually constructed out of a U-shaped piece of steel that connects to the left and right sides of the suspension and at two points in between. This may be difficult for vehicles that have abnormally shaped or sized chassis or hulls. Forcing a steel shape to conform to irregular hull or chassis shapes reduces that steel shape's stiffness, and the anti-roll bar becomes excessively heavy for its relative stiffness. With component weights having a direct effect on vehicle performance, including fuel economy, this is undesirable. For instance, some specialized vehicles have V-hulls. These V-hulls would require the shape of the anti-roll bar to be modified to go under or above the V-Hull, or for the V-hull to be outfitted with holes for allowing the anti-roll bar to pas through the V-hull. Either way, this process of outfitting and installing a mechanical anti-roll bar on an abnormally shaped vehicle or chassis, may be very difficult and expensive, or lead to additional design compromises. Thus, there is a need to create an anti-roll system that can be installed on various shapes of hulls and chassis, which can address, mitigate, or eliminate these design compromises and which can offer additional functionality and performance.

An additional problem with mechanical anti-roll bars is the inherent metallurgy of the anti-roll bars. Again, these metal U-shaped anti-roll bars are linked between the left and right wheels of a vehicle. With metal anti-roll bars, the metallurgy of the bars requires thicker and stronger bars to provide stiffer anti-roll forces, to ensure that the mechanical anti-roll bar does not yield due to torsional stress. These thicker or stronger bars inherently affect the articulation or wheel travel of the vehicle's suspension. Consequently, it very difficult, if not impossible to fine tune the anti-roll forces of a mechanical anti-roll bar for high articulation vehicles. For example, a high articulation vehicle might desire a certain amount of anti-roll resistance. If this desired anti-roll resistance is high, the vehicle will require a thicker, stronger anti-roll bar that will allow for enough articulation, leading to wheel liftoff during corning. If the full articulation of the vehicle is allowed by the anti-roll bar, the strength of the bar must be lowered. This results in less anti-roll forces which leads to oversteering or understeering. Thus, there is a need for an anti-roll system that can be fine tuned regardless of wheel articulation.

A further problem with mechanical anti-roll bar systems is that once they are installed it is difficult to bypass or turnoff the anti-roll feature of the bar without having to completely remove or mechanically disengage the U-shaped bar from the suspension/wheels of the vehicle. Some vehicles, for example, an off-road vehicle, may desire that an anti-roll system be engaged when traveling at high speeds on road, and may also desire the anti-roll system to be disengaged when traveling off-road. Thus, there is a need for an anti-roll system for a vehicle that may be bypassed or disengaged quickly and easily.

The instant invention is designed to address the above mentioned problems.

SUMMARY OF THE INVENTION

The instant invention is a hydraulic anti-roll system for a vehicle. The hydraulic anti-roll system includes a first hydraulic actuator, a second hydraulic actuator, a first compression line, a second compression line, an anti-roll control module, and an anti-roll bypass valve. The first hydraulic actuator is adapted to be connected between the suspension and frame of the vehicle on one side and the second hydraulic actuator is adapted to be connected between the suspension and frame of the vehicle on its other side. The first compression line is connected between a first compression chamber of the first hydraulic actuator and a second expansion chamber of the second hydraulic actuator. The second compression line is connected between a second compression chamber of the second hydraulic actuator and a first expansion chamber of the first hydraulic actuator. The anti-roll control module is connected between the first and second compression lines of the first and second hydraulic actuators. The anti-roll control module resists the compression of the first hydraulic actuator relative to the expansion of the second hydraulic actuator, and resists the compression of the second hydraulic actuator relative to the expansion of the first hydraulic actuator. The anti-roll bypass valve is adapted to activate and deactivate the resistance of the anti-roll control module.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

FIG. 4 shows a perspective view of the hydraulic anti-roll system for a vehicle shown in FIG. 1 with the individual components shown in cross-section.

FIG. 4A shows a cross-section of a portion of the anti-roll control module shown in the hydraulic anti-roll system for a vehicle in FIG. 1.

DETAILED DESCRIPTION OF THE INVENTION

Figure 1:
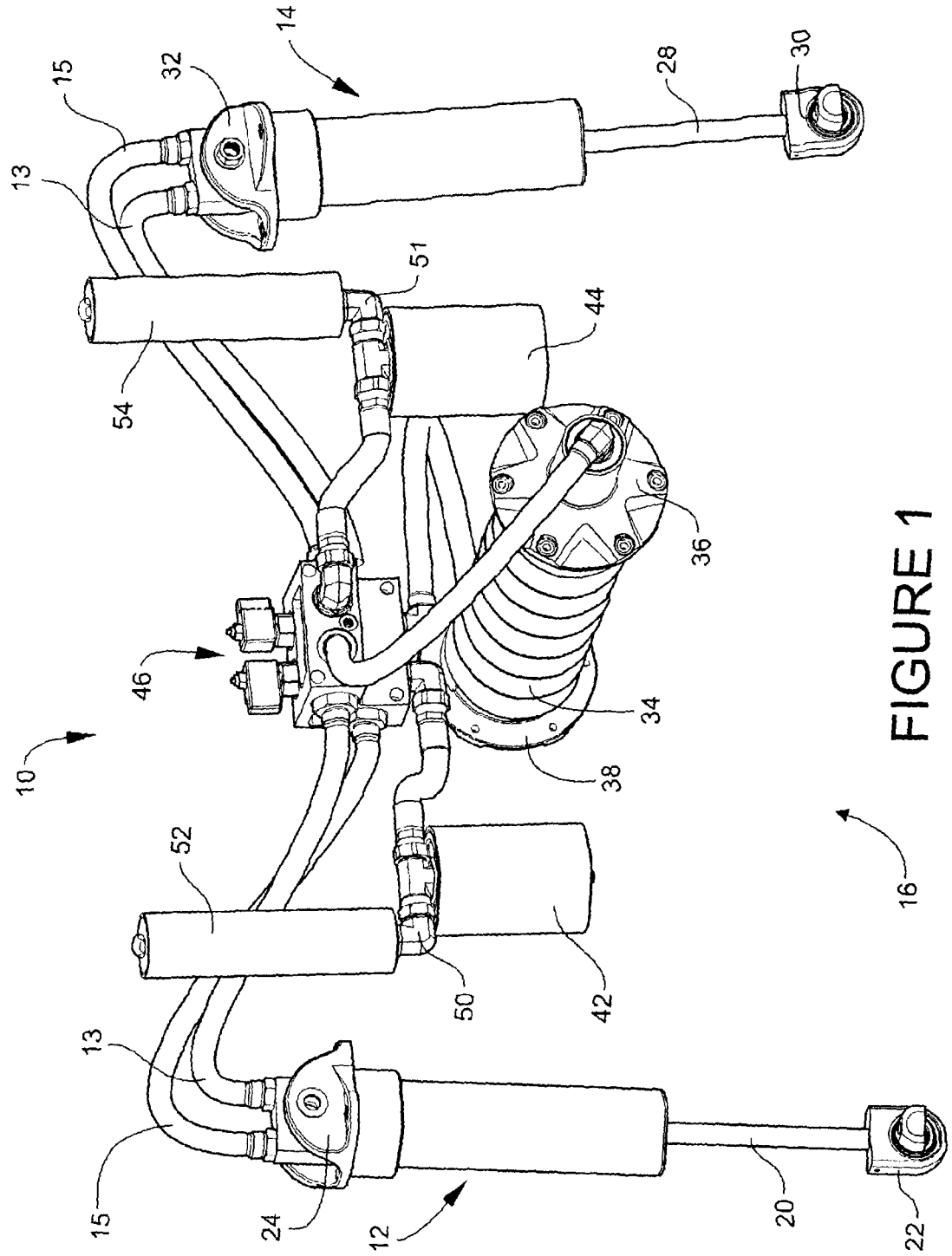
FIG. 1 shows a perspective view from the front side of one embodiment of the hydraulic anti-roll system for a vehicle according to the instant invention.
Figure 2:
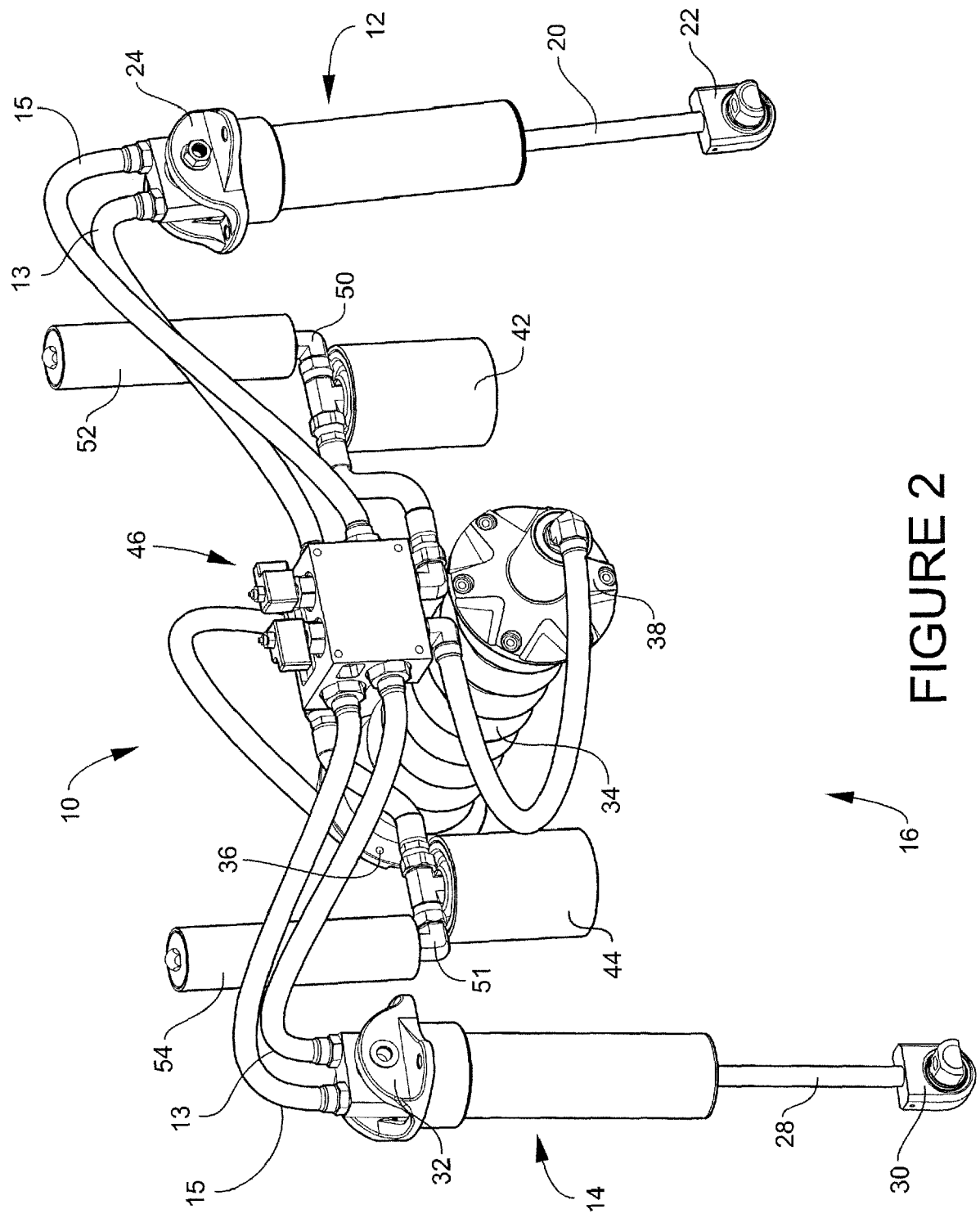
FIG. 2 shows a perspective view from the rear side of the embodiment of the hydraulic anti-roll system for a vehicle shown in FIG. 1.
Figure 3:
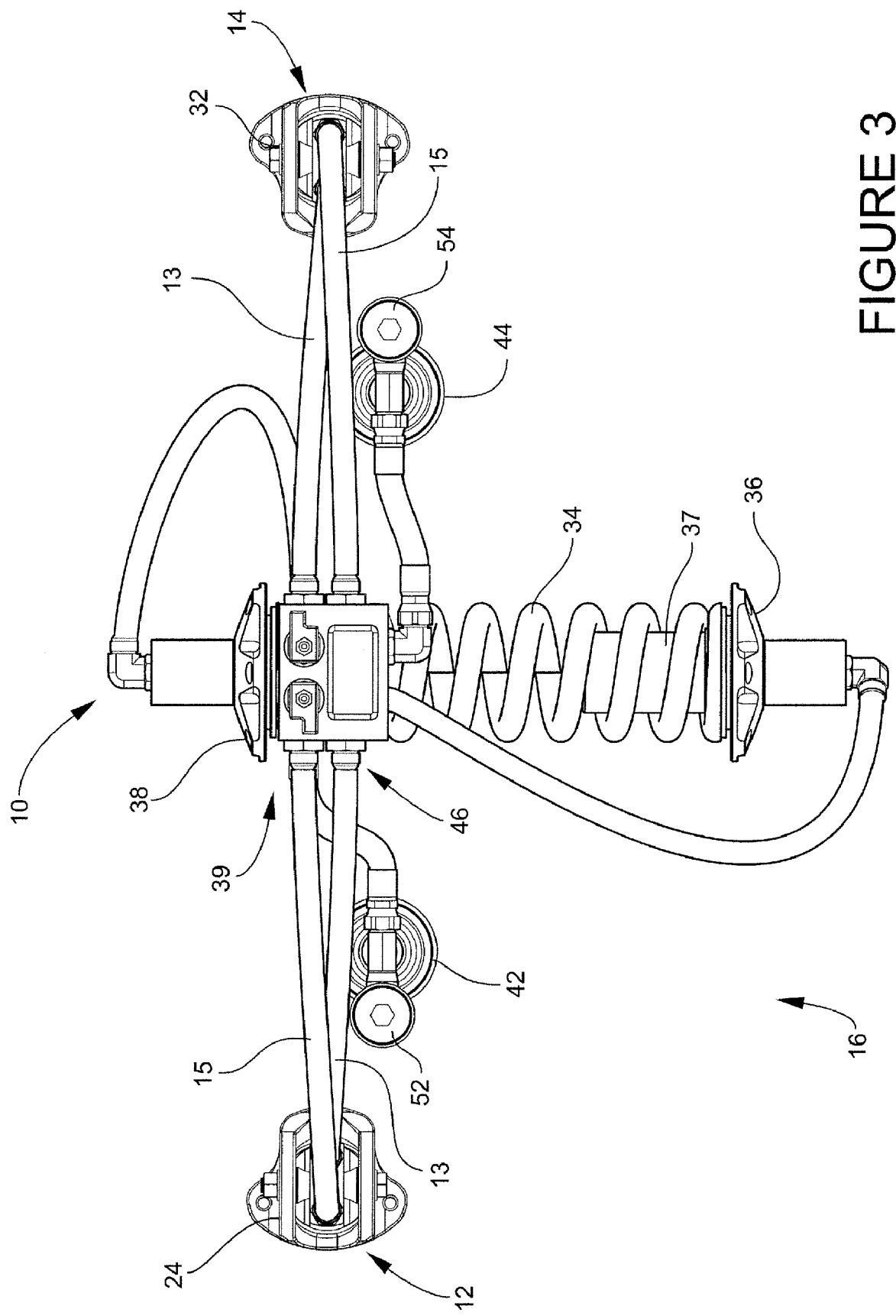
FIG. 3 shows a top view of the embodiment of the hydraulic anti-roll system for a vehicle shown in FIG. 1.
Figure 4B:
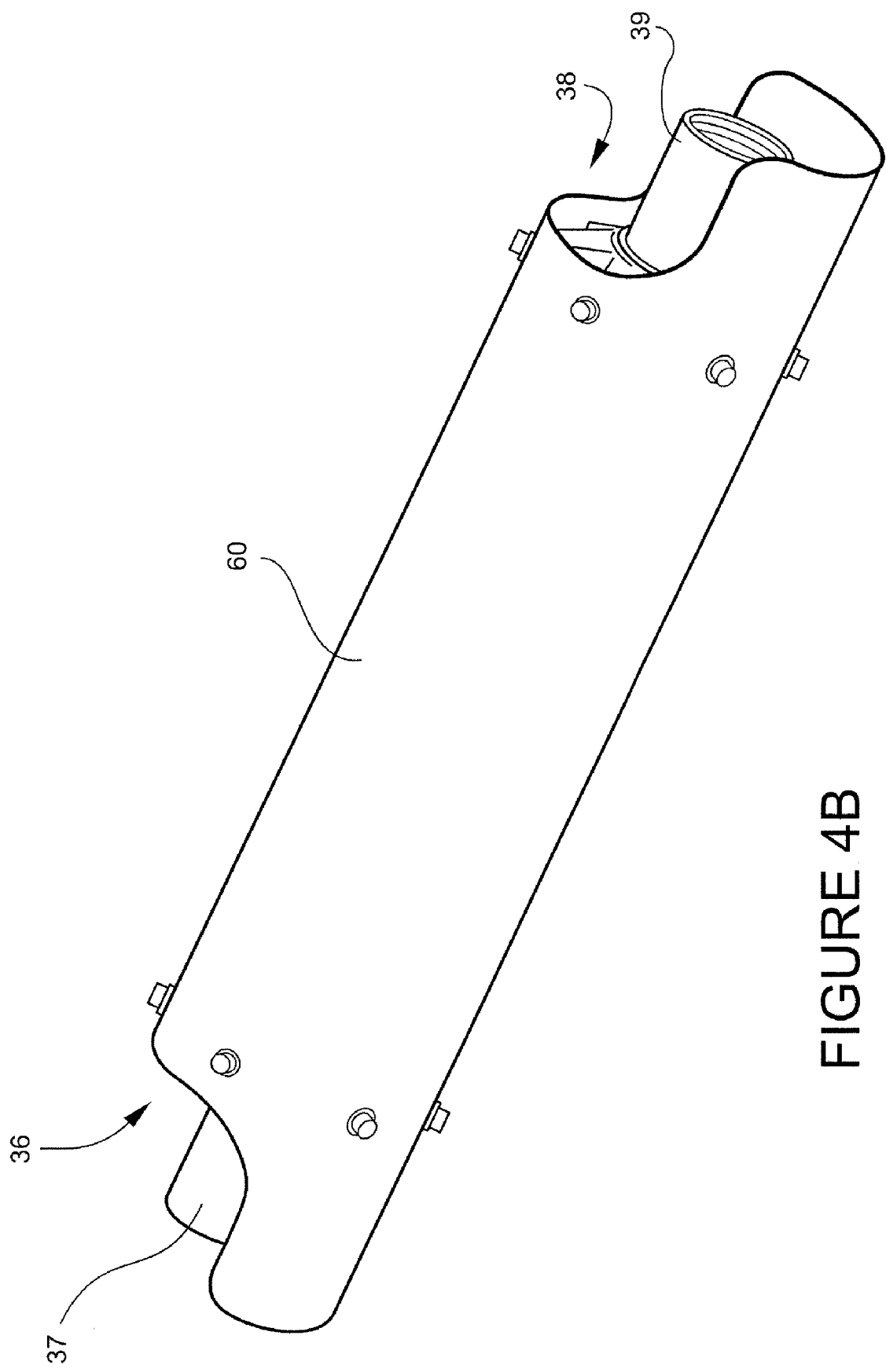
FIG. 4B shows a perspective view of an embodiment of a portion of the anti-roll control module with the stressed tube member included.
Figure 4C:
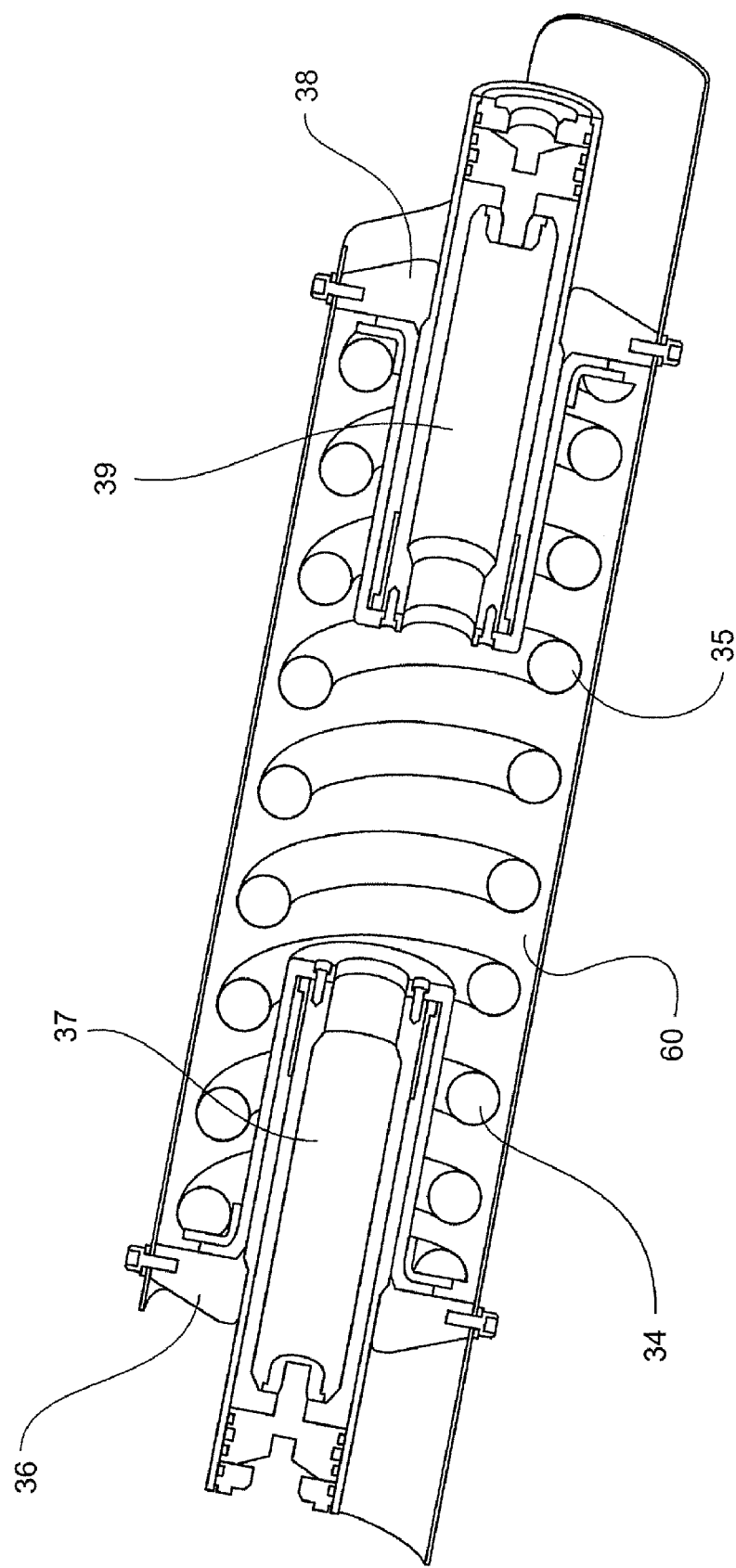
FIG. 4C shows a cross-sectional view of the embodiment shown in FIG. 4B.

Referring to the drawings, wherein like numerals indicate like elements, there is shown in FIGS. 1-4 an embodiment of a hydraulic anti-roll system 10 for a vehicle. Hydraulic anti-roll system 10 (may be referred to hereinafter as merely system 10) may be installed on a vehicle to provide anti-roll stiffening to the vehicle. System 10 may be installed on any type of vehicle that desires anti-roll stiffening. This includes, but is not limited to, off-road vehicles, on-road vehicles, commercial vehicles, personal vehicles, military vehicles, law enforcement vehicles, leisure vehicles that are designed to be used both on water and on land, etc.

System 10 is a hydraulic system and does not include the use of a U-shaped anti-roll or sway bar. This allows hydraulic system 10 to be installed on all abnormally shaped or sized chassis and hulls with no requirement to mechanically attach a torsion bar, or a bent metal shaped bar, from a wheel on one side of the vehicle, to a wheel on the other side of the vehicle. Hydraulic anti-roll system 10 merely requires hydraulic lines to be run from one side of the vehicle to the other between a first hydraulic actuator 12 and a second hydraulic actuator 14, and an anti-roll control module 16 to be positioned or mounted on the vehicle somewhere in between. In addition, because system 10 is hydraulic, an anti-roll bypass valve 46 may be provided within system 10 for activating and deactivating the stiffening of the system, for example, but not limited to, by the push of a button, the turn of a switch, or through some connection to on-board vehicle controls, sensors, or logic. Furthermore, because system 10 is hydraulic, system 10 may be fine tuned at any desired vehicle articulation or wheel travel. Because the system is hydraulic, actuators 12 and 14 may be provided in different sizes and lengths for allowing adequate wheel articulation at varying strengths or roll resistances.

System 10 may be installed on the front suspension of a vehicle, the rear suspension of a vehicle, or be cross-linked between the front and rear suspensions. In addition, multiple systems 10 may be utilized, where one system 10 is installed on the front suspension, and one system 10 is installed on the rear suspension of the vehicle. Furthermore, for multi-axle vehicles, i.e., vehicles with 3, or more axles, system 10 or multiple systems 10 may be installed on any or all of the axles, or a combination thereof. With the use of multiple systems 10, the systems may be installed where the front and rear wheels (or any other axles) are cross-linked with one another. For example, the front right hydraulic actuator 12 could be linked with the rear left hydraulic actuator 14 and the front left hydraulic actuator 14 could be linked with the rear right hydraulic actuator 12. In this situation, a switch or valve could be provided between the two systems 10 for switching the systems 10 from being cross-linked and not cross-linked.

First hydraulic actuator 12 may be provided in hydraulic anti-roll system 10. See FIGS. 1-8. First hydraulic actuator 12 may be adapted for connection between the suspension and frame of a vehicle on one side. First hydraulic actuator 12 may be mounted between the suspension and frame of a vehicle by any methods known to one skilled in the art, for example, methods similar to the installation of a standard shock. First hydraulic actuator 12 may be for providing an actuator on one side of the vehicle for resisting the roll towards that side of the vehicle. First hydraulic actuator 12 may be any type or size actuator, which may be selected based on the type and size of vehicle that system 10 may be installed on. In one embodiment, first hydraulic actuator 12 may be a hydraulic actuator similar to a standard hydraulic shock. First hydraulic actuator 12 may generally include: a first actuator piston 18 located inside the first actuator; a first actuator piston rod 20 connected to first actuator piston 18; a first actuator suspension mount 22 connected to the end of first piston rod 20 for mounting the actuator to the suspension of the vehicle; and a first actuator body mount 24 for mounting the actuator to the vehicles body. First hydraulic actuator 12 may also include a first compression chamber 19 above first actuator piston 18 and a first expansion chamber 21 below first actuator piston 18, or vice versa. First hydraulic actuator 12 may be similar to part number MSI25210238, designed and manufactured by MSI Defense Solutions, LLC of Mooresville, N.C.

Second hydraulic actuator 14 may be provided in hydraulic anti-roll system 10. See FIGS. 1-8. Second hydraulic actuator 14 may be adapted for connection between the suspension and frame of a vehicle on the opposite side of first hydraulic actuator 12. Second hydraulic actuator 14 may be mounted between the suspension and frame of a vehicle by any methods known to one skilled in the art, for example, a method similar to the installation of a standard shock. Second hydraulic actuator 14 may be for providing an actuator on the opposite side of the vehicle from first hydraulic actuator 12 for resisting the roll towards that side of the vehicle. Second hydraulic actuator 14 may be any type or size actuator, which may be selected based on the type and size of vehicle that system 10 may be installed on. Second hydraulic actuator 14 may be similar to first hydraulic actuator 12. In one embodiment, second hydraulic actuator 14 may be a hydraulic actuator similar to a standard hydraulic shock. Second hydraulic actuator 14 may generally include: a second actuator piston 26 located inside second hydraulic actuator 14; a second actuator piston rod 28 connected to second actuator piston 26; a second actuator suspension mount 30 connected to the end of second piston rod 28 for mounting the hydraulic actuator to the suspension of the vehicle; and a second actuator body mount 32 for mounting the hydraulic actuator to the vehicles body. Second hydraulic actuator 14 may also include a second compression chamber 27 above second actuator piston 26 and a second expansion chamber 29 below second actuator piston 26, or vice versa. Second hydraulic actuator 14 may be similar to part number MSI25210238, designed and manufactured by MSI Defense Solutions LLC of Mooresville, N.C.

Anti-roll control module 16 may be included in hydraulic anti-roll system 10. See FIGS. 1-8. Anti-roll control module 16 may be for resisting the compression of first hydraulic actuator 12 relative to the expansion of second hydraulic actuator 14. Anti-roll control module 16 may also be for resisting the compression of second hydraulic actuator 14 relative to the expansion of first hydraulic actuator 12. Anti-roll control module 16 may be any device capable of resisting the compression of first hydraulic actuator 12 relative to the expansion of second hydraulic actuator 14 and the compression of second hydraulic actuator 14 relative to the expansion of first hydraulic actuator 12. These resisting forces provided by anti-roll control module 16 to hydraulic actuators 12 and 14 provide roll resistance to the vehicle. In addition to providing roll resistance to the hydraulic actuators, the module 16 may also provide dampening forces to the fluid transfer from one actuator's compression stroke to the rebound stroke of the opposite side.

When hydraulic anti-roll system 10 is activated, first compression chamber 19 of first hydraulic actuator 12 may be in fluid communication with second expansion chamber 29 of second hydraulic actuator 14 via a first compression line 13. In addition, second compression chamber 27 of second hydraulic actuator 14 may be in fluid communication with first expansion chamber 21 of first hydraulic actuator 12 via a second compression line 15. As shown in FIGS. 1-4, for convenience, the connections for compression lines 13 and 15 to both the compression chamber and expansion chamber of first hydraulic actuator 12 and second hydraulic actuator 14 may be provided at the top of the hydraulic actuators (actuators are provided with internal cylinder for routing rebound chambers to the top of the actuators). However, the invention is not so limited, and the connections may be provided anywhere on hydraulic actuators 12 and 14. Anti-roll control module 16 may then be connected between first compression chamber 19 of first hydraulic actuator 12 and second expansion chamber 29 of second hydraulic actuator 14 via first compression line 13. Anti-roll control module 16 may also be connected between second compression chamber 27 of second hydraulic actuator 14 and first expansion chamber 21 of first hydraulic actuator 12 via second compression line 15. This linkage between first hydraulic actuator 12 and second hydraulic actuator 14 allows anti-roll control module 16 to take-up while resisting the transfer of fluid from the compression of first hydraulic actuator 12 and the expansion of second hydraulic actuator 14, and to take-up and resist the transfer of fluid from the compression of second hydraulic actuator 14 and the expansion of first hydraulic actuator 12. This process of taking-up and resisting fluid transfer by anti-roll control module 16 allows system 10 to provide anti-roll forces to the vehicle or forces that stiffen the roll stiffness of the vehicle with forces transmitted between the body and suspension through hydraulic actuators 12 and 14.

Anti-roll bypass valve 46 may be included in hydraulic anti-roll system 10. See FIGS. 1-8. Anti-roll bypass valve 46 may be for activating and deactivating the resistance of anti-roll control module 16. Anti-roll bypass valve 46 may allow the operator of a vehicle to easily switch between having the anti-roll of his/her vehicle activated and not having the anti-roll of his/her vehicle activated, i.e., the system is deactivated. Anti-roll bypass valve 46 may include a housing with an activation position and a deactivation position, as shown in FIGS. 1-4. The activated position of bypass valve 46 may be adapted to connect first compression chamber 19 with second expansion chamber 29 via first compression line 13 and second compression chamber 27 with first expansion chamber 21 via second compression line 15. The activated position of bypass valve 46 basically connects the compression chamber of one actuator with the expansion chamber of the opposite actuator to allow system 10 to resist the roll of the vehicle. The deactivated position of bypass valve 46 may be adapted to disconnect the first and second compression lines 13 and 15 where the first compression chamber 19 is connected with the first expansion chamber 21 of first hydraulic actuator 12 and second compression chamber 27 is connected with the second expansion chamber 29. The deactivated position of bypass valve 46 basically makes first and second hydraulic actuators 12 and 14 closed circuits, so that no force (or negligible force) is provided from first and second hydraulic actuators 12 and 14 on the vehicle's suspension. Anti-roll bypass valve 46 is shown in FIGS. 1-4 with two electro-mechanical valves (commercially available valves from Parker-Hannifin of Cleveland, Ohio, part number GS068620V/CCP024H) for activating and deactivating anti-roll control module 16. However, the invention is not so limited, and bypass valve 46 may be any other similar electromechanical valves, by any other manual valves (see FIG. 7A), or by any other valves capable of activating and deactivating control module 16. In one embodiment, bypass valve 46 may be an electronic valve that may be wired to the inside of the vehicle. This electronic embodiment of bypass valve 46 may allow a user of the vehicle to easily activate and deactivate hydraulic anti-roll system 10. In addition, anti-roll bypass valve 46 being an electronic valve may allow system 10 to be a variable system. For instance, anti-roll bypass valve 46 may be in communication with the vehicles speedometer, where at low speeds, anti-roll system 10 may be deactivated, and at high speeds, anti-roll system 10 may be activated. In another instance, anti-roll bypass valve 46 may be in communication with the vehicles tire pressure system, where at certain higher tire pressures, anti-roll system 10 may be activated, and at certain lower tire pressures, anti-roll system 10 may be deactivated.

The hydraulic anti-roll system 10 of the instant invention may be provided with an anti-roll resistance via the stiffness provided in anti-roll control module 16. The resistance of anti-roll control module 16 may be provided by any means. In one embodiment, the resistance of anti-roll control module 16 may be provided by a first accumulating actuator 37 and a second accumulating actuator 39. The accumulating actuators 37 and 39 may be for taking-up and resisting the transfer of fluid from first and second hydraulic actuators 12 and 14. The stiffness of accumulating actuators 37 and 39 may be provided by a single anti-roll spring 34 (see FIGS. 1-4 and 8) associated with both accumulating actuators, or may be provided by a first anti-roll spring 34 associated with first accumulating actuator 37 and a second anti-roll spring 35 associated with second accumulating actuator 39 (see FIGS. 5-6). In another embodiment, the stiffness of anti-roll control module 16 may be provided by a dual sided actuator 58 biased toward the middle by anti-roll spring 34 and second anti-roll spring 35 (see FIG. 7). The stiffness of anti-roll control module 16 may be varied by varying the stiffness of accumulating actuators 37 and 39 or dual sided actuator 58 provided in system 10 via anti-roll spring 34 and/or second anti-roll spring 35. In addition, the resistance of hydraulic anti-roll system 10 may be varied through many other means for varying the stiffness of accumulating actuators 37 and 39, or dual sided actuator 58. These means, include, but are not limited to, varying the effective area of the hydraulic actuators, providing a variable stiffness circuit 48 with a first variable stiffness reducer 52 and a second variable stiffness reducer 54, providing an anti-roll stiffness increaser 40, a combination of these elements, and/or any other means for stiffening or reducing the resistance of anti-roll system 10. These components of anti-roll control module 16 are discussed in greater detail below.

Figure 5:
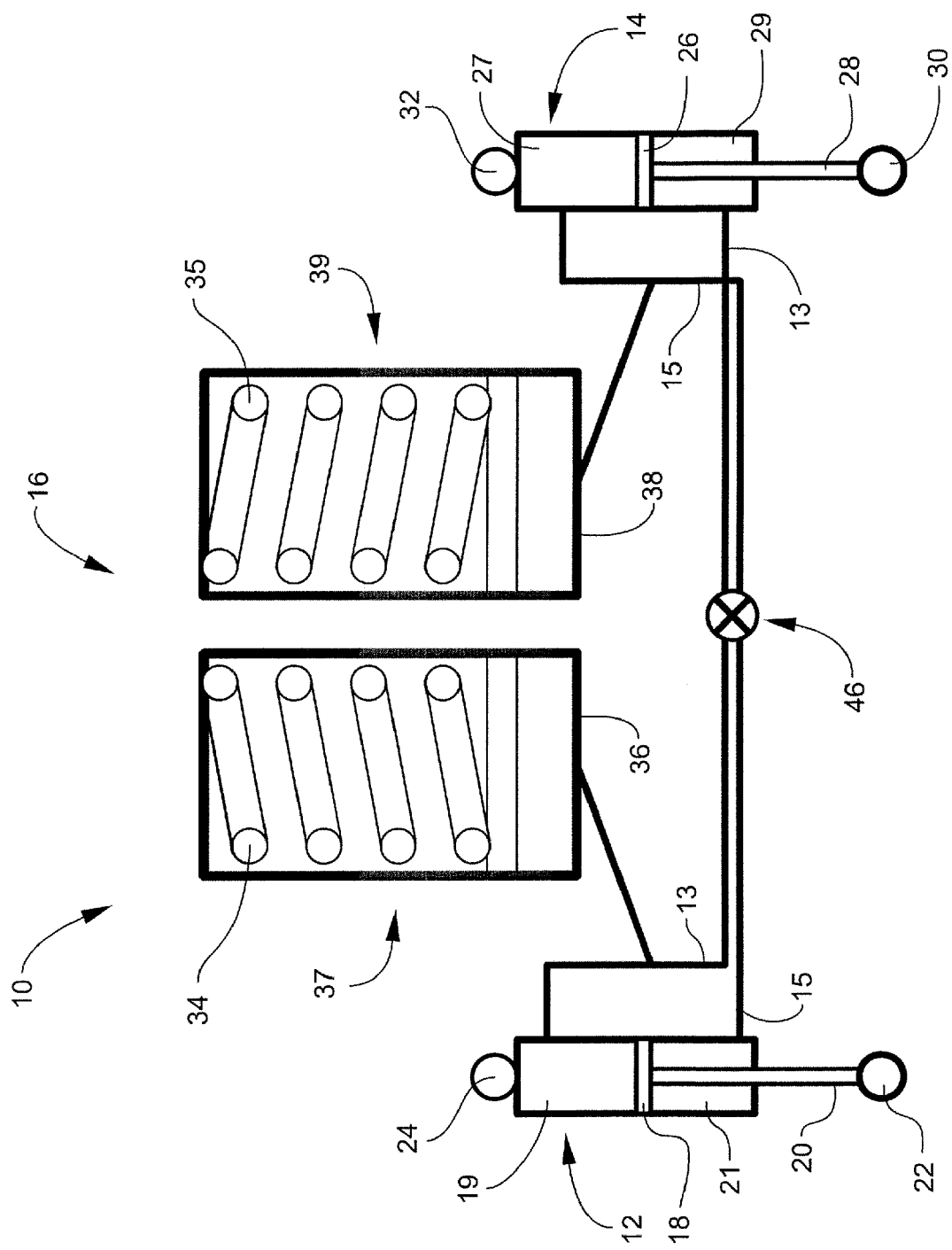
FIG. 5 shows a schematic representation of another embodiment of the hydraulic anti-roll system according to the instant invention.
Figure 6:
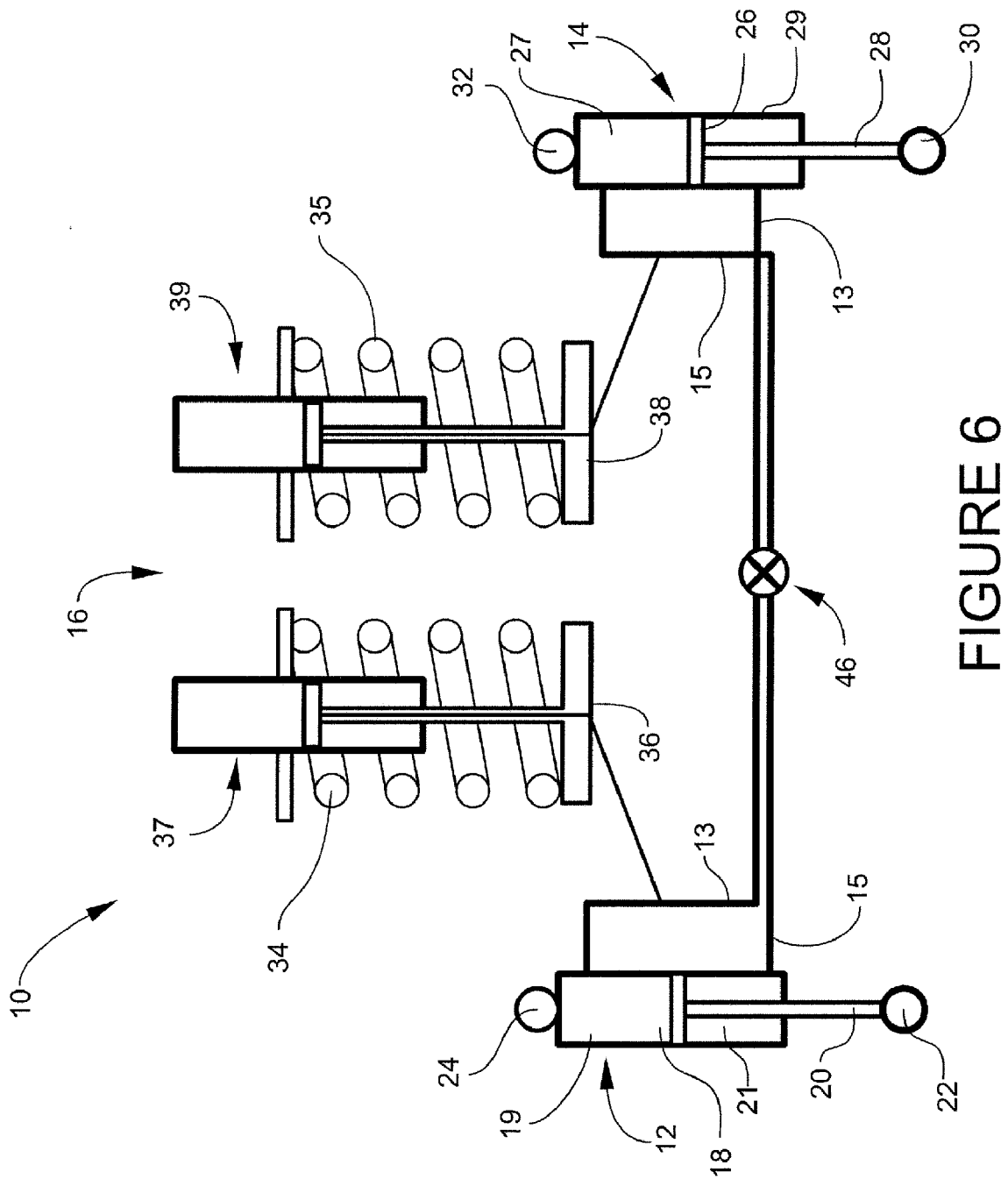
FIG. 6 shows a schematic representation of another embodiment of the hydraulic anti-roll system according to the instant invention.
Figure 7:
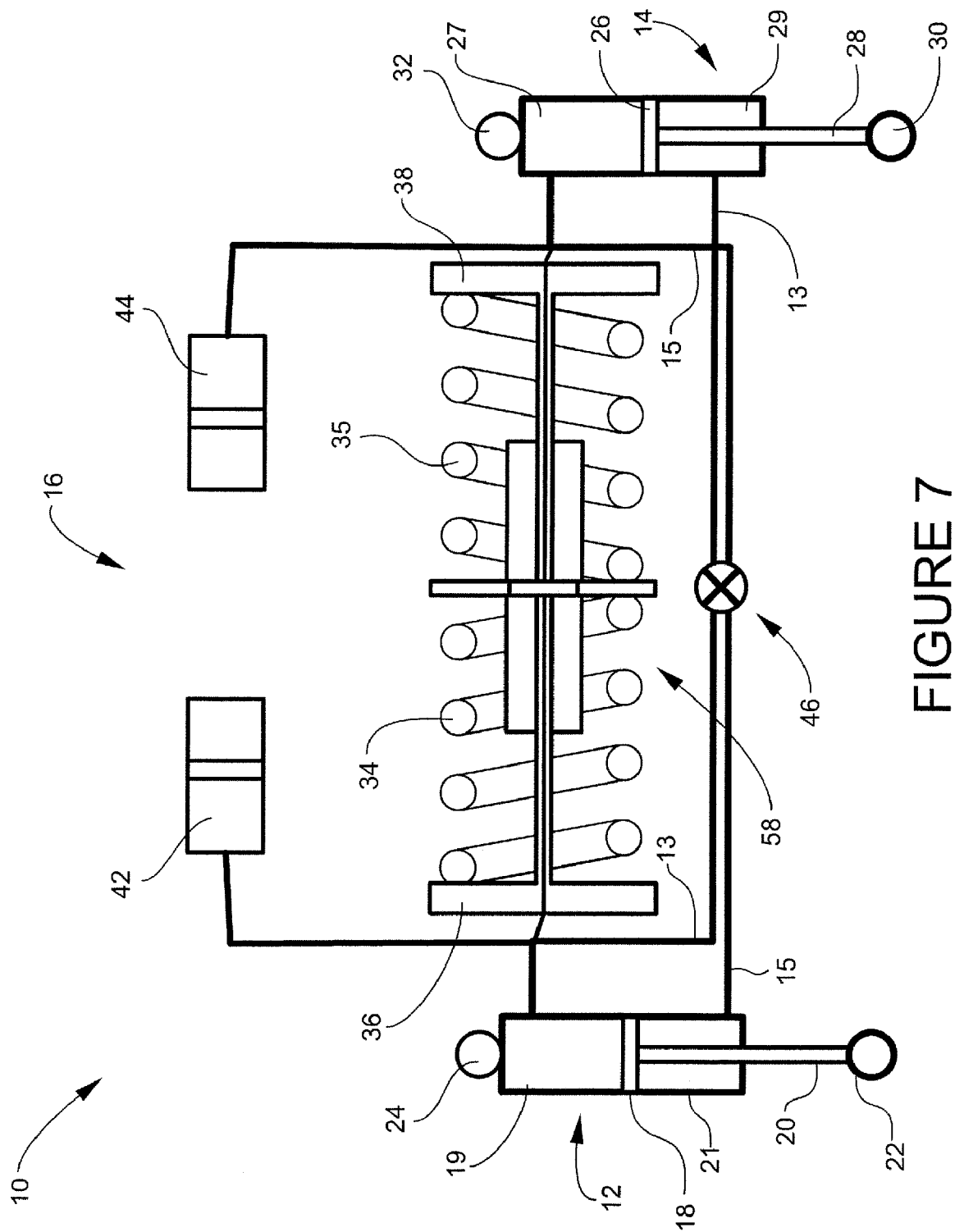
FIG. 7 shows a schematic representation of yet another embodiment of the hydraulic anti-roll system according to the instant invention.

First and second accumulating actuators 37 and 39 may be provided in anti-roll control module 16. See FIGS. 1-6 and 8. First accumulating actuator 37 may be for taking-up and resisting the transfer of fluid from first compression chamber 19 and second expansion chamber 29. First accumulating actuator 37 takes up the fluid from first compression chamber 19 and second expansion chamber 29 while resisting this flow. Accordingly, the volume of first accumulating actuator 37 should be at least approximate to the volume of first compression chamber 19 plus the volume of second expansion chamber 29, to allow for full articulation. The stiffness of first accumulating actuator 37 is provided by anti-roll spring 34 which biases first accumulating actuator 37 from compressing. Second accumulating actuator 39 may be for taking-up and resisting the transfer of fluid from second compression chamber 27 and first expansion chamber 21. Second accumulating actuator 39 takes up the fluid from second compression chamber 27 and first expansion chamber 21 while resisting this flow. Accordingly, the volume of second accumulating actuator 39 should be at least approximate to the volume of second compression chamber 27 plus the volume of first expansion chamber 21, to allow for full articulation. The stiffness of second accumulating actuator 39 is provided by a spring which biases second accumulating actuator 39 from compressing. This spring is anti-roll spring 34 in some embodiments (FIGS. 1-4 and 8) and a second anti-roll spring 35 in other embodiments (FIGS. 5-7). By taking up and resisting the transfer of fluid from first hydraulic actuator 12 and second hydraulic actuator 14, first and second accumulating actuators 37 and 39 provide a load resistance to the fluid from one actuator's compression stroke and the rebound stroke of the opposite side, thus, providing anti-roll forces to first and second hydraulic actuators 12 and 14, respectively. First and second accumulating actuators 37 and 39, in combination, may also allow first hydraulic actuator 12 and second hydraulic actuator 14 to be compressed simultaneously. In this situation, fluid from first compression chamber 19 may enter second expansion chamber 29, however, because the volumes of these chambers are different, the excess fluid must flow into first accumulating actuator 37. At the same time, fluid from second compression chamber 27 may enter first expansion chamber 21, however, because the volumes of these chambers are different, the excess fluid must flow into second accumulating actuator 39. First and second accumulating actuators 37 and 39 may also take-up fluid from thermal expansion of the fluid in the hydraulic system. First and second accumulating actuators 37 and 39 may be any devices capable of taking up and resisting the transfer of fluid or providing a load resistant to fluid transfer. In one embodiment, first and second accumulating actuators 37 and 39 may be standard hydraulic actuators. First and second accumulating actuators 37 and 39 may be similar to part number MSI25210239, designed and manufactured by MSI Defense Solutions LLC of Mooresville, N.C.

Dual sided actuator 58 may be included in anti-roll control module 16. See FIG. 7. Dual sided actuator 58 may be for taking up and resisting the transfer of fluid from first compression chamber 19 and second expansion chamber 29 (similar to first accumulating actuator 37 in other Figures) and for taking up and resisting the transfer of fluid from second compression chamber 27 and first expansion chamber 21 (similar to second accumulating actuator 39 in other Figures). The stiffness of dual sided actuator 58 is provided by anti-roll spring 34 and second anti-roll spring 35, which in combination, bias the dual sided actuator 58 to the center of first mounting flange 36 and second mounting flange 38. By taking up and resisting the transfer of fluid from first hydraulic actuator 12 and second hydraulic actuator 14, dual sided actuator 58 may provide a load resistance to the fluid transfer from one actuator's compression stroke and the rebound stroke of the opposite side, thus, providing anti-roll forces to first and second hydraulic actuators 12 and 14, respectively. As should be understood, dual sided actuator 58 may be used in substitution of first and second accumulating actuators 37 and 39. In one embodiment, dual sided actuator 58 may be a standard dual sided hydraulic actuator. Hydraulic dual-sided actuator 58 may be similar to part number MSI23609720, designed and manufactured by MSI Defense Solutions LLC of Mooresville, N.C.

A first give back chamber 42 and a second give back chamber 44 may be included with anti-roll control module 16. See FIGS. 1-4 and 7-8. Although give back chambers 42 and 44 are only shown in some embodiments (FIGS. 1-4 and 7-8), it should be understood that give back chambers 42 and 44 may be optionally provided in all embodiments of system 10. First give back chamber 42 may be connected in series with first accumulating actuator 37 via first compression line 13. First give back chamber 42 may be adapted to give back the additional hydraulic fluid needed from the compression of second hydraulic actuator 14 and the expansion of first hydraulic actuator 12 (i.e., fluid entering second accumulating actuator 39), and/or the thermal expansion of the fluid and other component materials of system 10. The volume of first give back chamber 42 may be at least approximate to the volume of first compression chamber 19 plus the volume of second expansion chamber 29, to allow for full articulation.

Second give back chamber 44 may be connected in series with second accumulating actuator 39 via second compression line 15. Second give back chamber 44 may be adapted to house the additional hydraulic fluid needed from the compression of first hydraulic actuator 12 minus the expansion of second hydraulic actuator 14 (i.e., fluid entering first accumulating actuator 37) and/or the thermal expansion of the fluid and other component materials of system 10. The volume of second give back chamber 44 may be at least approximate to the volume of second compression chamber 27 plus the volume of first expansion chamber 21, to allow for full articulation. First and second give back chamber 42 and 44 may be similar to part number MSI23610051, designed and manufactured by MSI Defense Solutions LLC of Mooresville, N.C.

A first anti-roll stiffness reducer 52 and second anti-roll stiffness reducer 54 may be included with anti-roll control module 16 via a variable stiffness circuit 48. See FIGS. 1-4 and 8. Although the stiffness reducers 52 and 54 are only shown in some embodiments, stiffness reducers 52 and 54 may be optionally provided with all embodiments. First anti-roll stiffness reducer 52 may be for taking-up and reducing the stiffening of first accumulating actuator 37, and consequently, the compression of first hydraulic actuator 12 and expansion of second hydraulic actuator 14. First anti-roll stiffness reducer 52 may be connected in series with first accumulating actuator 37 via first compression line 13. Second anti-roll stiffness reducer 54 may be for taking-up and reducing the stiffening of second accumulating actuator 39, and consequently, the compression of second hydraulic actuator 14 and expansion of first hydraulic actuator 12. Second anti-roll stiffness reducer 54 may be connected in series with second accumulating actuator 39 via second compression line 15. In one embodiment, a first variable stiffness valve 50 may be included between first anti-roll stiffness reducer 52 and first accumulating actuator 37. First variable stiffness valve 50 may be adapted to activate and deactivate first anti-roll stiffness reducer 52. Likewise, a second variable stiffness valve 51 may be included between second anti-roll stiffness reducer 54 and second accumulating actuator 39. Second variable stiffness valve 51 may be adapted to activate and deactivate second anti-roll stiffness reducer 54. First and second variable stiffness valves 50 and 51 may provide anti-roll control module 16 with the option of lowering or varying the stiffness of the anti-roll forces provided by system 10. In one embodiment, first and second anti-roll stiffness reducers 52 and 54 may be hydraulic actuators. First and second anti-roll stiffness reducers 52 and 54 may be similar to part number MSI23610051, designed and manufactured by MSI Defense Solutions LLC of Mooresville, N.C.

A variable stiffness air amplifier 56 may be included with first and second anti-roll stiffness reducers 52 and 54 in variable stiffness circuit 48. See FIG. 8. Variable stiffness air amplifier 56 may be for varying or tuning the stiffness reduction provided by first and second anti-roll stiffness reducers 52 and 54. Variable stiffness air amplifier 56 may be any device for varying or tuning the stiffness reduction provided by first and second anti-roll stiffness reducers 52 and 54. In one embodiment, variable stiffness air amplifier 56 may be an on-board compressed air system, similar to ones used on commercial trucks, that may be utilized to vary or tune the stiffness of first and second anti-roll stiffness reducers 52 and 54.

An anti-roll stiffness increaser 40 may be included with anti-roll control module 16. See FIG. 8. Although stiffness increaser 40 is only shown in one embodiment, as should be understood, stiffness increaser 40 may be optionally provided with all embodiments. Anti-roll stiffness increaser 40 may be for increasing the stiffness of the anti-roll provided by system 10. Anti-roll stiffness increaser 40 may be adapted for increasing the stiffness of first accumulating actuator 37 and second accumulating actuator 39. Anti-roll stiffness increaser 40 may be connected between first accumulating actuator 37 and second accumulating actuator 39. Anti-roll stiffness increaser 40 may be any devices for increasing the stiffness of first accumulating actuator 37 and second accumulating actuator 39. In one embodiment, anti-roll stiffness increaser 40 may be an air bladder attached over anti-roll spring 34 for increasing the bias of anti-roll spring 34 (and anti-roll spring 35 in some embodiments) on first accumulating actuator 37 and second accumulating actuator 39. In another embodiment, anti-roll stiffness increaser 40 may be an additional spring in association with anti-roll spring 34 (and second anti-roll spring 35 in some embodiments) for increasing the bias of anti-roll spring 34 on first accumulating actuator 37 and second accumulating actuator 39. Stiffness can be increased through the use of the air bladder, an additional spring, or any other stiffness increaser 40. The stiffness provided by stiffness increaser 40 may either be through the entire stroke (basically increasing the stiffness of the system linearly) or through a portion of the stroke of anti-roll actuators 37 and 39 (i.e. the device would have progressive roll stiffness), or as a function of hydraulic actuators 12 and/or 14 stroke, or combinations thereof.

Referring to FIGS. 1-4 and 8, a first embodiment of anti-roll control module 16 is shown. This embodiment is shown schematically in FIG. 8. In this embodiment, anti-roll control module 16 may generally include a first accumulating actuator 37, a second accumulating actuator 39, a first mounting flange 36, a second mounting flange 38, and an anti-roll spring 34. First accumulating actuator 37 may be mounted to first mounting flange 36. Second accumulating actuator 39 may be mounted to second mounting flange 38. First mounting flange 36 must be fixed relative to second mounting flange 38. This means that the distance between first mounting flange 36 and second mounting flange 38 must be fixed. In one embodiment (as shown in FIGS. 1-4 and 8), first and second mounting flanges 36 and 38 may both be adapted to be mounted to the vehicle, thus allowing the two flanges to be positioned relative to one another where the distance between them is fixed. First and second mounting flanges 36 and 38 may be mounted to the vehicle in any location and by any means, including, but not limited to, bolting flanges 36 and 38 to the vehicle's chassis. In another embodiment, first and second mounting flanges 36 and 38 may be connected to one another by a stressed tube member 60 (see FIGS. 4B and 4C) adapted to keep the distance between mounting flanges 36 and 38 constant. Stressed tube member 60 may be interconnected between first and second mounting flanges 36 and 38 by any means, including, but not limited to, being bolted to flanges 36 and 38. In this embodiment, first and second mounting flanges 36 and 38 would not have to be mounted to the vehicle and could be placed or secured anywhere on the vehicle. Anti-roll spring 34 may be interconnected between first accumulating actuator 37 and second accumulating actuator 39. Anti-roll spring 34 may be for biasing first and second accumulating actuators 37 and 39 from compressing.

In operation, when the vehicle rolls towards first hydraulic actuator 12, first hydraulic actuator 12 will have forces acting on it to compress and second hydraulic actuator 14 may have forces acting on it to expand. When anti-roll bypass valve 46 is in the activated position, these forces will force the hydraulic fluid from first compression chamber 19 and second expansion chamber 29 into first accumulating actuator 37 via first compression line 13. First accumulating actuator 37 may resist the transfer of fluid from first compression chamber 19 and second expansion chamber 29 via anti-roll spring 34 (and stiffness increaser 40, when provided). The anti-roll stiffness provided by first accumulating actuator 37 may be varied by providing a different stiffness of anti-roll spring 34 (or stiffness increaser 40, when provided). When first variable stiffness valve 50 is open, first anti-roll stiffness reducer 52 may also take in fluid, thereby reducing the roll stiffness provided by first accumulating actuator 37. Any extra fluid required from the take up of first accumulating actuator 37 will be provided by second give back chamber 44 to the other side of the system. When anti-roll bypass valve 46 is in the deactivated position, fluid from first compression chamber 19 is pumped into first expansion chamber 21 and no (or negligible) anti-roll stiffening forces are provided to first hydraulic actuator 12.

In operation, when the vehicle rolls towards second hydraulic actuator 14, second hydraulic actuator 14 will have forces acting on it to compress and first hydraulic actuator 12 may have forces acting on it to expand. When anti-roll bypass valve 46 is in the activated position, these forces will force the hydraulic fluid from second compression chamber 27 and first expansion chamber 21 into second accumulating actuator 39 via second compression line 15. Second accumulating actuator 39 may resist the transfer of fluid from second compression chamber 27 and first expansion chamber 21 via anti-roll spring 34 (and stiffness increaser 40, if provided). The anti-roll stiffness provided by second accumulating actuator 39 may be varied by varying the stiffness of anti-roll spring 34. When second variable stiffness valve 51 is open, second anti-roll stiffness reducer 54 may also take in fluid, thereby reducing the roll stiffness provided by second accumulating actuator 39. Any extra fluid required from the take up of second accumulating actuator 39 will be provided by first give back chamber 42. When anti-roll bypass valve 46 is in the deactivated position, fluid from second compression chamber 27 is pumped into second expansion chamber 29 and no (or negligible) anti-roll stiffening forces are provided to second hydraulic actuator 14.

Referring to FIGS. 5 and 6, a second embodiment of anti-roll control module 16 is schematically shown for hydraulic anti-roll system 10. In this embodiment, anti-roll control module 16 generally includes: a first accumulating actuator 37 having an anti-roll spring 34; and a second accumulating actuator 39 having a second anti-roll spring 35. In this embodiment first and second accumulating actuators 37 and 39 include separate anti-roll springs that are not linked together, as in the embodiments shown in FIGS. 1-4 and 8. In this embodiment, the first and second accumulating actuators 37 and 39 may be mounted on a singled mounting flange together (not shown in Figures), or first accumulating actuator 37 may be mounted on first mounting flange 36 and second accumulating actuator 39 may be mounted on second mounting flange 38 separately. Different from FIGS. 1-4 and 8, the mounting flanges 36 and 38 of this embodiment may be mounted anywhere on the vehicle, at any distance from one another, and by any means. In one embodiment, referring to FIG. 5, first accumulating actuator 37 may include a hydraulic cylinder with an anti-roll piston inside being biased by an anti-roll spring 34 and second accumulating actuator 39 may include a hydraulic cylinder with a second anti-roll piston inside being biased by a second anti-roll spring 35. In another embodiment, referring to FIG. 6, first accumulating actuator 37 may include a hydraulic cylinder with a piston connected to a piston rod being biased from the hydraulic cylinder by anti-roll spring 34, and second accumulating actuator 39 may include a second hydraulic cylinder with a second piston connected to a second piston rod being biased from the second hydraulic cylinder by a second anti-roll spring 35.

In operation, when the vehicle rolls towards first hydraulic actuator 12, first hydraulic actuator 12 will have forces acting on it to compress and second hydraulic actuator 14 may have forces acting on it to expand. When anti-roll bypass valve 46 is in the activated position, these forces will force the hydraulic fluid from first compression chamber 19 and second expansion chamber 29 into first accumulating chamber 37 via first compression line 13. First accumulating actuator 37 may resist the transfer of fluid from first compression chamber 19 and second expansion chamber 29 via anti-roll spring 34. The anti-roll stiffness provided by first accumulating actuator 37 may be varied by varying the stiffness of anti-roll spring 34. When anti-roll bypass valve 46 is in the deactivated position, fluid from first compression chamber 19 is pumped into first rebound chamber 21 and no (or negligible) anti-roll stiffening forces are provided by first hydraulic actuator 12.

In operation, when the vehicle rolls towards second hydraulic actuator 14, second hydraulic actuator 14 will have forces acting on it to compress and first hydraulic actuator 12 may have forces acting on it to expand. When anti-roll bypass valve 46 is in the activated position, these forces will force the hydraulic fluid from second compression chamber 27 and first expansion chamber 21 into second accumulating actuator 39 via second compression line 15. Second accumulating actuator 39 may resist the transfer of fluid from second compression chamber 27 and first expansion chamber 21 via second anti-roll spring 35. The anti-roll stiffness provided by second accumulating actuator 39 may be varied by varying the stiffness of second anti-roll spring 35. When anti-roll bypass valve 46 is in the deactivated position, fluid from second compression chamber 27 is pumped into second expansion chamber 29 and no anti-roll stiffening forces are provided by second hydraulic actuator 14.

Figure 7A:
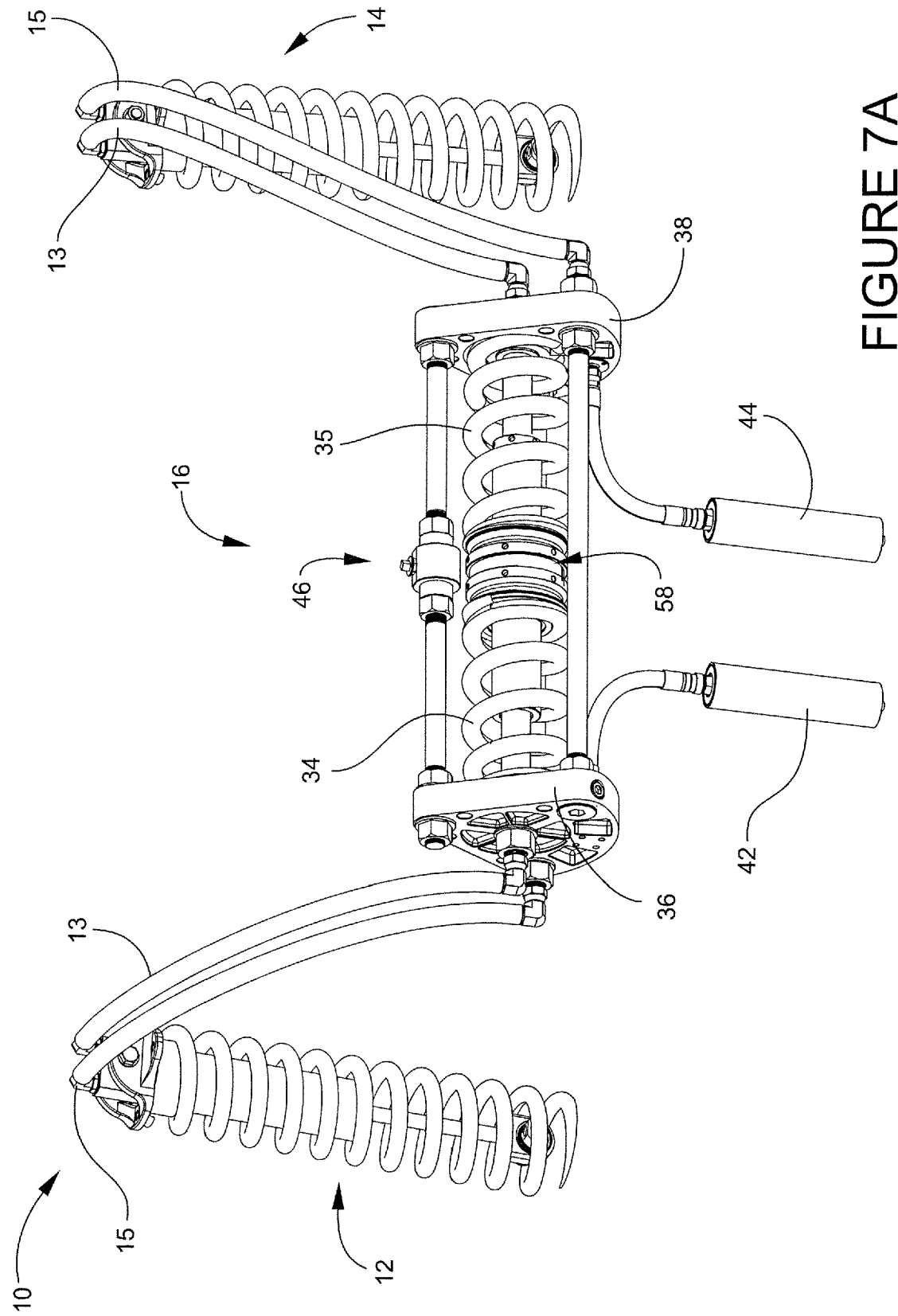
FIG. 7A shows a perspective view of the embodiment of the hydraulic anti-roll control system of the invention as shown in the schematics of FIG. 7.
Figure 8:
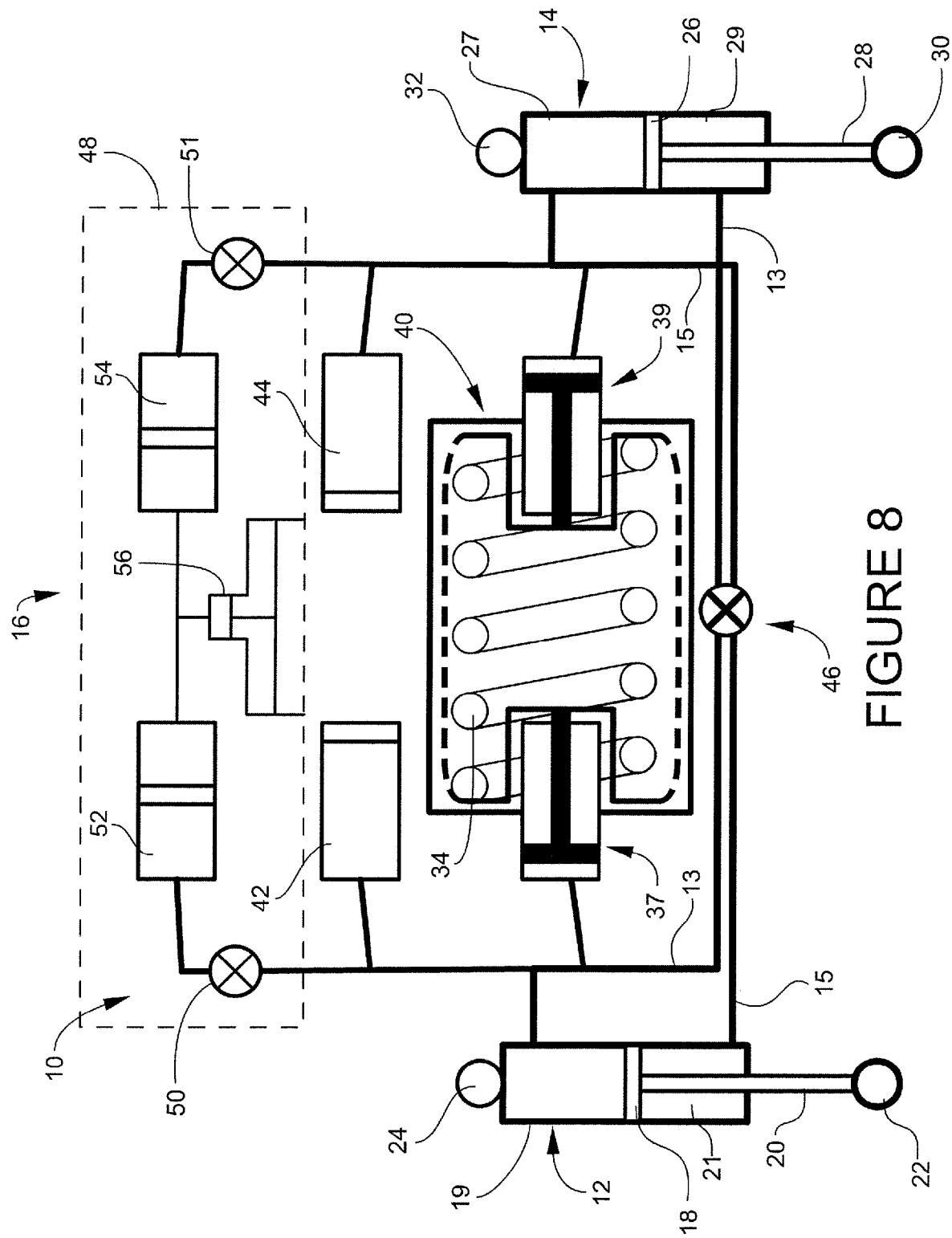
FIG. 8 shows a schematic representation of yet another embodiment of the hydraulic anti-roll system according to the instant invention.

Referring to FIGS. 7 and 7A, a third embodiment of anti-roll control module 16 is shown for hydraulic anti-roll system 10. In this embodiment, anti-roll control module 16 generally includes: a first mounting flange 36, a second mounting flange 38, and a dual sided actuator 58 positioned in between. In one embodiment (as shown in FIG. 7), the first and second mounting flanges 36 and 38 may be adapted to be mounted on the vehicle where the flanges are positioned relative to one another. This means that the distance between first and second mounting flanges 36 and 38 must be held constant. In one embodiment, mounting flanges 36 and 38 may be mounted to the vehicle. In another embodiment, first and second mounting flanges 36 and 38 may be connected to one another by a stressed tube member 60 (see FIGS. 4B and 4C) adapted to keep the distance between mounting flanges 36 and 38 constant. In this embodiment, first and second mounting flanges 36 and 38 would not have to be mounted and could be placed or secured anywhere on the vehicle. Dual sided actuator 58 may be positioned between first and second mounting flanges 36 and 38. Dual sided actuator 58 may include anti-roll spring 34 and second anti-roll spring 35, in combination, biasing dual sided actuator 58 to the middle of first and second mounting flanges 36 and 38. A first give back chamber 42 may be connected in series with one side of dual sided actuator 58, and a second give back chamber 44 may be connected in series with the other side of dual sided actuator 58.

In operation, when the vehicle rolls towards first hydraulic actuator 12, first hydraulic actuator 12 will have forces acting on it to compress and second hydraulic actuator 14 may have forces acting on it to expand. When anti-roll bypass valve 46 is in the activated position, these forces will force the hydraulic fluid from first compression chamber 19 and second expansion chamber 29 into one side of dual sided actuator 58 via first compression line 13. Dual sided actuator 58 may resist the transfer of fluid from first compression chamber 19 and second expansion chamber 29 via anti-roll spring 34. With these forces, dual sided actuator 58 will move to the left (as depicted in FIG. 7) and anti-roll spring 34 will resist this movement. The anti-roll stiffness provided by dual sided actuator 58 may be varied by varying the stiffness of anti-roll spring 34. Any extra fluid required from the take up of dual sided actuator 58 will be provided by second give back chamber 44. When anti-roll bypass valve 46 is in the deactivated position, fluid from first compression chamber 19 is pumped into first expansion chamber 21 and no (or negligible) anti-roll stiffening is provided.

In operation, when the vehicle rolls towards second hydraulic actuator 14, second hydraulic actuator 14 will have forces acting on it to compress and first hydraulic actuator 12 may have forces acting on it to expand. When anti-roll bypass valve 46 is in the activated position, these forces will force the hydraulic fluid from second compression chamber 27 and first expansion chamber 21 into the other side of dual sided actuator 58 via second compression line 15. Dual sided actuator 58 may resist the transfer of fluid from second compression chamber 27 and first expansion chamber 21 via anti-roll spring 35. With these forces, dual sided actuator 58 will move to the right (as depicted in FIG. 7) and anti-roll spring 35 will resist this movement. The anti-roll stiffness provided by dual sided actuator 58 may be varied by varying the stiffness of anti-roll spring 35. Any extra fluid required from the take up of dual sided actuator 58 will be provided by first give back chamber 42. When anti-roll bypass valve 46 is in the deactivated position, fluid from second compression chamber 27 is pumped into second expansion chamber 29 and no (or negligible) anti-roll stiffening are provided by second hydraulic actuator 14.

The instant invention also includes a method of providing anti-roll to a vehicle. The method of providing anti-roll to a vehicle generally comprises the steps of: mounting a first hydraulic actuator between the suspension and frame of the vehicle on one side; mounting a second hydraulic actuator between the suspension and frame of the vehicle on its other side; connecting an anti-roll control module between the fluid lines of said first and second hydraulic actuators, whereby said anti-roll control module stiffening the compression of said first actuator relative to the expansion of said second actuator and stiffening the compression of said second actuator relative to the expansion of said first actuator; and connecting an anti-roll bypass valve between the fluid lines of said first and second hydraulic actuators adapted to activate and deactivate the stiffening of said anti-roll control module. As should be understood, the method also includes providing and installing the optional components of anti-roll control module 16, as discussed above and shown in FIGS. 1-8.

EXAMPLE

Two embodiments of hydraulic anti-roll system 10, as shown in FIG. 7, were assembled and installed on the front and rear suspension/wheels of a 4 wheel, 2 axle vehicle. The vehicle was tested on an asphalt paved skidpad with a 200 foot radius nominal turning circle. The vehicle was tested in the following four configurations: with both systems 10 disengaged on all wheels (anti-roll bypass valve 46 in the disengaged position for both front and rear systems 10), shown in Table 1; with both systems 10 engaged on all wheels (anti-roll bypass valve 46 in the engaged position for both front and rear systems 10), shown in Table 2; with systems 10 engaged on the front wheels and disengaged on the rear wheels (anti-roll bypass valve 46 in the engaged position for front system 10 and anti-roll bypass valve 46 in the disengaged position for rear system 10), shown in Table 3; and with systems 10 engaged on the rear wheels and disengaged on the front wheels (anti-roll bypass valve 46 in the engaged position for rear system 10 and anti-roll bypass valve 46 in the disengaged position for front system 10), shown in Table 4. The results of these tests are shown in the below tables:

TABLE 1

| Invention Disengaged both Front and Rear, (Actuator Displacement, Inches) | | | | Calculated Roll Angle (deg.) | % of Baseline Roll Angle Reduced by Invention | |
|---|---|---|---|---|---|---|
| LF | 1.0 | −0.83 | RF | 1.00 | Front Axle Roll Angle | N/A |
| LR | 1.0 | −0.83 | RR | 1.00 | Rear Axle Roll Angle | N/A |
| Shuttle Displacement, in.: Not Recorded | | | | 1.00 | Average Roll Angle | N/A |

TABLE 2

| Invention Engaged both Front and Rear, (Actuator Displacement, Inches) | | | | Calculated Roll Angle (deg.) | % of Baseline Roll Angle Reduced by Invention | |
|---|---|---|---|---|---|---|
| LF | 0.33 | −0.5 | RF | 0.455 | Front Axle Roll Angle | −54.5% |
| LR | 0.33 | −0.4 | RR | 0.400 | Rear Axle Roll Angle | −60.0% |
| Shuttle Displacement, in.: 0.754 | | | | 0.428 | Average Roll Angle | −57.3% |

TABLE 3

| Invention Engaged on Front Wheels, Invention Disengaged on Rear Wheels (Actuator Displacement, Inches) | | | | Calculated Roll Angle (deg.) | % of Baseline Roll Angle Reduced by Invention | |
|---|---|---|---|---|---|---|
| LF | 0.60 | −0.67 | RF | 0.775 | Front Axle Roll Angle | −30.9% |
| LR | 0.83 | −0.67 | RR | 0.819 | Rear Axle Roll Angle | −18.2% |
| Shuttle Displacement, in.: 1.100 | | | | 0.754 | Average Roll Angle | −24.5% |

TABLE 4

| Invention Engaged on Rear Wheels, Invention Disengaged on Front Wheels (Actuator Displacement, Inches) | | | | Calculated Roll Angle (deg.) | % of Baseline Roll Angle Reduced by Invention | |
|---|---|---|---|---|---|---|
| LF | 0.60 | −0.56 | RF | 0.637 | Front Axle Roll Angle | −36.4% |
| LR | 0.40 | −0.43 | RR | 0.456 | Rear Axle Roll Angle | −54.5% |
| Shuttle Displacement, in.: Not Recorded | | | | 0.546 | Average Roll Angle | −45.5% |

The present invention may be embodied in other forms without departing from the spirit and the essential attributes thereof, and, accordingly, reference should be made to the appended claims, rather than to the foregoing specification, as indicated in the scope of the invention.

The invention claimed is:

1. A hydraulic anti-roll system for a vehicle comprising:
a first hydraulic actuator;
a second hydraulic actuator;
said first hydraulic actuator being adapted to be connected between the suspension and frame of the vehicle on one side and said second hydraulic actuator being adapted to be connected between the suspension and frame of the vehicle on its other side;
a first compression line connected between a first compression chamber of said first hydraulic actuator and a second expansion chamber of said second hydraulic actuator;
a second compression line connected between a second compression chamber of said second hydraulic actuator and a first expansion chamber of said first hydraulic actuator;
an anti-roll control module connected between said first and second compression lines of said first and second hydraulic actuators;
said anti-roll control module taking-up and resisting the transfer of fluid from the compression of said first hydraulic actuator and the expansion of said second hydraulic actuator via said first compression line;
said anti-roll control module taking-up and resisting the transfer of fluid from the compression of said second hydraulic actuator and the expansion of said first hydraulic actuator via said second compression line;
said anti-roll control module comprising:
a first accumulating actuator connected to a first mounting flange adapted to take-up and resist the transfer of fluid from said first compression chamber and said second expansion chamber via said first compression line;
a second accumulating actuator connected to a second mounting flange adapted to take-up and resist the transfer of fluid from said second compression chamber and said first expansion chamber via said second compression line;
said first mounting flange being fixed relative to said second mounting flange; and
an anti-roll spring interconnecting said first accumulating actuator with said second accumulating actuator and biasing said first and second accumulating actuators from compressing; and
an anti-roll bypass valve adapted to activate and deactivate said anti-roll control module.

2. The hydraulic anti-roll system for a vehicle of claim 1 wherein said anti-roll bypass valve having an activated position and a deactivated position;
said activated position adapted to connect said first compression line between said first compression chamber and said second expansion chamber and to connect said second compression line between said second compression chamber and said first expansion chamber; and
said deactivated position adapted to disconnect said first compression line where said first compression chamber being connected with said first expansion chamber and to disconnect said second compression line where said second compression chamber being connected with said second expansion chamber.

3. The hydraulic anti-roll system for a vehicle of claim 1 wherein said anti-roll control module further comprising:
a first give back chamber connected in series with said first accumulating actuator adapted to house the additional hydraulic fluid from the take up of said second accumulating actuator; and
a second give back chamber connected in series with said second accumulating actuator adapted to house the additional hydraulic fluid from the take-up of said first accumulating actuator.

4. The hydraulic anti-roll system for a vehicle of claim 1 wherein said anti-roll control module further comprising a variable stiffness circuit.

5. The hydraulic anti-roll system for a vehicle of claim 4 wherein said variable stiffness circuit comprising:
a first anti-roll stiffness reducer connected in series with said first accumulating actuator adapted to reduce the stiffening of said first accumulating actuator;
a second anti-roll stiffness reducer connected in series with said second accumulating actuator adapted to reduce the stiffening of said second accumulating actuator;
a first variable stiffness valve connected between said first anti-roll stiffness reducer and said first accumulating actuator adapted to activate and deactivate said first anti-roll stiffness reducer; and
a second variable stiffness valve connected between said second anti-roll stiffness reducer and said second accumulating actuator adapted to activate and deactivate said second anti-roll stiffness reducer.

6. The hydraulic anti-roll system for a vehicle of claim 1 wherein said anti-roll control module further comprising an anti-roll stiffness increaser, said anti-roll stiffness increaser adapted for increasing the resistance of said first accumulating actuator and said second accumulating actuator.

7. The hydraulic anti-roll system for a vehicle of claim 6 wherein said anti-roll stiffness increaser being connected between said first accumulating actuator and said second accumulating actuator and being selected from the group consisting of: an air bladder and an additional spring.

8. The hydraulic anti-roll system for a vehicle of claim 1 wherein said anti-roll bypass valve comprising a housing for switching said anti-roll bypass valve between said activated position and said deactivated position.

9. The hydraulic anti-roll system for a vehicle of claim 1 wherein said anti-roll control module being capable of operating on a single axle of the vehicle.

10. A hydraulic anti-roll system for a vehicle comprising:
a first hydraulic actuator;
a second hydraulic actuator;
said first hydraulic actuator being adapted to be connected between the suspension and frame of the vehicle on one side and said second hydraulic actuator being adapted to be connected between the suspension and frame of the vehicle on its other side;

a first compression line connected between a first compression chamber of said first hydraulic actuator and a second expansion chamber of said second hydraulic actuator;

a second compression line connected between a second compression chamber of said second hydraulic actuator and a first expansion chamber of said first hydraulic actuator;

an anti-roll control module connected between said first and second compression lines of said first and second hydraulic actuators;

said anti-roll control module taking-up and resisting the transfer of fluid from the compression of said first hydraulic actuator and the expansion of said second hydraulic actuator via said first compression line;

said anti-roll control module taking-up and resisting the transfer of fluid from the compression of said second hydraulic actuator and the expansion of said first hydraulic actuator via said second compression line;

said anti-roll control module comprising:
  a first accumulating actuator connected to a first mounting flange adapted to take-up and resist the transfer of fluid from said first compression chamber and said second expansion chamber via said first compression line;
  a second accumulating actuator connected to a second mounting flange adapted to take-up and resist the transfer of fluid from said second compression chamber and said first expansion chamber via said second compression line;
  said first mounting flange being fixed relative to said second mounting flange; and
  an anti-roll spring interconnecting said first accumulating actuator with said second accumulating actuator and biasing said first and second accumulating actuators from compressing;
  a first give back chamber connected in series with said first accumulating actuator adapted to house the additional hydraulic fluid from the take up of said second accumulating actuator; and
  a second give back chamber connected in series with said second accumulating actuator adapted to house the additional hydraulic fluid from the take-up of said first accumulating actuator;
  a variable stiffness circuit comprising
    a first anti-roll stiffness reducer connected in series with said first accumulating actuator adapted to reduce the stiffening of said first accumulating actuator;
    a second anti-roll stiffness reducer connected in series with said second accumulating actuator adapted to reduce the stiffening of said second accumulating actuator;
    a first variable stiffness valve connected between said first anti-roll stiffness reducer and said first accumulating actuator adapted to activate and deactivate said first anti-roll stiffness reducer; and
    a second variable stiffness valve connected between said second anti-roll stiffness reducer and said second accumulating actuator adapted to activate and deactivate said second anti-roll stiffness reducer; and
  an anti-roll stiffness increaser, said anti-roll stiffness increaser adapted for increasing the resistance of said first accumulating actuator and said second accumulating actuator;
  said anti-roll stiffness increaser being connected between said first accumulating actuator and said second accumulating actuator and being selected from the group consisting of: an air bladder and an additional spring; and
  an anti-roll bypass valve adapted to activate and deactivate said anti-roll control module.

11. The hydraulic anti-roll system of claim 10 wherein said anti-roll bypass valve having an activated position and a deactivated position;
  said activated position adapted to connect said first compression line between said first compression chamber and said second expansion chamber and to connect said second compression line between said second compression chamber and said first expansion chamber; and
  said deactivated position adapted to disconnect said first compression line where said first compression chamber being connected with said first expansion chamber and to disconnect said second compression line where said second compression chamber being connected with said second expansion chamber.

12. The hydraulic anti-roll system for a vehicle of claim 11 wherein said anti-roll bypass valve comprising a housing for switching said anti-roll bypass valve between said activated position and said deactivated position.

13. The hydraulic anti-roll system for a vehicle of claim 10 wherein said anti-roll control module being capable of operating on a single axle of the vehicle.

14. A method of providing anti-roll to a vehicle comprising the steps of:
  mounting a first hydraulic actuator between the suspension and frame of the vehicle on one side;
  mounting a second hydraulic actuator between the suspension and frame of the vehicle on its other side;
  connecting an anti-roll control module connected between the fluid lines of said first and second hydraulic actuators, whereby said anti-roll control module stiffening the compression of said first hydraulic actuator relative to the expansion of said second hydraulic actuator and stiffening the compression of said second hydraulic actuator relative to the expansion of said first hydraulic actuator;
  said anti-roll control module comprising:
    a first accumulating actuator connected to a first mounting flange adapted to take-up and resist the transfer of fluid from said first compression chamber and said second expansion chamber via said first compression line;
    a second accumulating actuator connected to a second mounting flange adapted to take-up and resist the transfer of fluid from said second compression chamber and said first expansion chamber via said second compression line;
    said first mounting flange being fixed relative to said second mounting flange; and
    an anti-roll spring interconnecting said first accumulating actuator with said second accumulating actuator and biasing said first and second accumulating actuators from compressing; and
  connecting an anti-roll bypass between the fluid lines of said first and second hydraulic actuators valve adapted to activate and deactivate the stiffening of said anti-roll control module.

15. The method of providing anti-roll to a vehicle of claim 14 wherein said anti-roll control module being capable of operating on a single axle of the vehicle.

* * * * *